United States Patent
Lee et al.

(10) Patent No.: US 11,700,528 B2
(45) Date of Patent: Jul. 11, 2023

(54) METHOD AND APPARATUS FOR INSTALLING AND MANAGING PROFILE USING MESSAGE SERVICE

(71) Applicant: Samsung Electronics Co., Ltd., Suwon-si (KR)

(72) Inventors: Hyewon Lee, Suwon-si (KR); Duckey Lee, Suwon-si (KR); Jonghan Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 968 days.

(21) Appl. No.: 16/435,407

(22) Filed: Jun. 7, 2019

(65) Prior Publication Data

US 2019/0380026 A1 Dec. 12, 2019

(30) Foreign Application Priority Data

Jun. 7, 2018 (KR) ........................ 10-2018-0065435

(51) Int. Cl.
*H04W 12/00* (2021.01)
*H04W 8/18* (2009.01)
(Continued)

(52) U.S. Cl.
CPC ........... *H04W 12/037* (2021.01); *H04W 4/12* (2013.01); *H04W 8/183* (2013.01); *H04W 8/20* (2013.01);
(Continued)

(58) Field of Classification Search
CPC ..... H04W 12/037; H04W 4/12; H04W 8/183; H04W 8/20; H04W 8/26; H04W 4/70;
(Continued)

(56) References Cited

U.S. PATENT DOCUMENTS 9,854,426 B1 12/2017 Wang et al.
10,659,955 B2 * 5/2020 Lee ........................ H04W 12/06
(Continued)

FOREIGN PATENT DOCUMENTS

EP 3528518 A1 8/2019
KR 10-2017-0063275 A 6/2017
(Continued)

OTHER PUBLICATIONS

Supplementary European Search Report dated May 4, 2021, in connection with European Patent Application No. 19814251.5, 9 pages.
(Continued)

*Primary Examiner* — Charles C Jiang
*Assistant Examiner* — Biswajit Ghose

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The disclosure discloses a terminal including a transmission and reception unit and at least one processor. The at least one processor controls the transmission and reception unit so that the transmission and reception unit receives a message such as an SMS, an MMS, or an OTT including event download information from a communication operator server, searches for event download information from the received message such as the SMS, the MMS, or the OTT, transmits the event download information to another terminal if necessary, and receives an event from a
(Continued)

profile server with reference to the event download information.

18 Claims, 9 Drawing Sheets

(51) Int. Cl.
| | | |
|---|---|---|
| *H04W 8/20* | (2009.01) | |
| *H04W 4/12* | (2009.01) | |
| *H04W 8/26* | (2009.01) | |
| *H04W 12/037* | (2021.01) | |
| *H04W 4/70* | (2018.01) | |
| *H04L 67/12* | (2022.01) | |

(52) U.S. Cl.
CPC ............ *H04W 8/26* (2013.01); *H04L 67/12* (2013.01); *H04W 4/70* (2018.02)

(58) Field of Classification Search
CPC ....... H04W 8/205; H04W 12/35; H04W 4/14; H04W 12/06; H04W 88/04; H04L 67/12; H04L 63/0823; H04L 67/26; H04L 67/303; H04L 51/08; H04L 51/18; H04L 63/0428; H04L 67/34
See application file for complete search history.

(56) References Cited

U.S. PATENT DOCUMENTS

| | | | | |
|---|---|---|---|---|
| 2006/0268907 | A1* | 11/2006 | Lee | ............ H04W 4/00 370/465 |
| 2012/0260090 | A1 | 10/2012 | Hauck et al. | |
| 2013/0262298 | A1 | 10/2013 | Morley | |
| 2016/0050557 | A1 | 2/2016 | Park et al. | |
| 2016/0094525 | A1 | 3/2016 | Lin et al. | |
| 2016/0301529 | A1 | 10/2016 | Park et al. | |
| 2017/0156051 | A1* | 6/2017 | Park | ............ H04W 8/205 |
| 2017/0244837 | A1* | 8/2017 | Kim | ............ H04M 3/543 |
| 2018/0234837 | A1* | 8/2018 | Lee | ............ H04W 8/183 |
| 2019/0140837 | A1* | 5/2019 | Cheng | ............ H04W 12/40 |
| 2020/0059778 | A1 | 2/2020 | Li et al. | |
| 2020/0089488 | A1* | 3/2020 | Yu | ............ H04W 12/069 |
| 2020/0275256 | A1* | 8/2020 | Salmela | ............ H04W 8/205 |
| 2020/0351656 | A1* | 11/2020 | Johansson | ............ H04W 12/02 |
| 2020/0374686 | A1* | 11/2020 | Zhang | ............ G06F 8/61 |
| 2021/0385635 | A1* | 12/2021 | Johansson | ............ H04W 4/70 |

FOREIGN PATENT DOCUMENTS

| | | |
|---|---|---|
| WO | 2016024695 A1 | 2/2016 |
| WO | 2018/076711 A1 | 5/2018 |

OTHER PUBLICATIONS

ISA/KR, International Search Report and Written Opinion of the International Searching Authority, International Application No. PCT/KR2019/006706, dated Oct. 18, 2019, 10 pages.

Korean Intellectual Property Office, "Office Action," dated Feb. 27, 2023, in connection with Korean Patent Application No. 10-2018-0065435, 9 pages.

* cited by examiner

METHOD AND APPARATUS FOR INSTALLING AND MANAGING PROFILE USING MESSAGE SERVICE

CROSS-REFERENCE TO RELATED APPLICATION

This application is based on and claims priority under 35 U.S.C. § 119 to Korean Patent Application No. 10-2018-0065435, filed on Jun. 7, 2018, in the Korean Intellectual Property Office, the disclosure of which is herein incorporated by reference in its entirety.

BACKGROUND

1. Field

Various embodiments of the disclosure are related to a method and an apparatus for installing and managing a profile using a message service such as a short message service (SMS), a multi-media message service (MMS), or over the top (OTT).

Various embodiments of the disclosure are related to a method and an apparatus for a communication connection by downloading and installing a communication service to a terminal in a communication system.

Various embodiments of the disclosure are related to a method and an apparatus for installing and managing a profile by downloading the profile online in a communication system.

2. Description of Related Art

The above information is presented as background information only to assist with an understanding of the disclosure. No determination has been made, and no assertion is made, as to whether any of the above might be applicable as prior art with regard to the disclosure.

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

A universal integrated circuit card (UICC) is a smart card that is inserted and used in a mobile communication terminal or the like, and is also referred to as a UICC card. The UICC may include an access control module for access to a network of a mobile communication operator. Examples of the access control module include a universal subscriber identity module (USIM), a subscriber identity module (SIM), and an IP multimedia service identity module (ISIM). The UICC including the USIM is usually also referred to as a USIM card. Similarly, the UICC including the SIM module is also referred to as a SIM card.

The terms "SIM card", "UICC card", "USIM card", and "UICC in which ISIM is included" disclosed in the disclosure may be used as the same meaning herein. That is, the technical description of the SIM card may be applied to the USIM card, the ISIM card or the general UICC card in the same way.

The SIM card stores personal information of a mobile communication subscriber, and performs subscriber authentication and traffic security key generation during access to a mobile communication network, thereby enabling safe use of mobile communication.

Considering the environment at the time of proposing the disclosure, the SIM card is typically manufactured as a dedicated card for a specific mobile communication operator by a request of the specific mobile communication operator, and is released in a state where authentication information for access to the corresponding a network of the corresponding operator, for example, a universal subscriber identity module (USIM) application and an international mobile subscriber identity (IMSI), a K value, an OPc value, or the like, is previously contained in the card. Therefore, the manufactured SIM card is delivered to the corresponding mobile communication operator, and then the corresponding mobile communication operator provides the same to a subscriber. Thereafter, if necessary, the corresponding mobile communication operator may perform management of applications in the UICC, including installation, modification, and deletion of the applications, by using an over the air (OTA) technology. The subscriber can use the network of the corresponding mobile communication operator and application services by inserting the UICC card into his/her own mobile communication terminal, and when replacing the terminal with a new one, can use the authentication information, the mobile communication phone number, the personal phonebook, and the like stored in the UICC card, as they are in the new terminal by taking out the UICC card from the old terminal and inserting the same into the new terminal.

However, the SIM card causes inconvenience to a mobile communication terminal user when the mobile communication terminal user is provided with a service from other mobile communication operators. The mobile communication terminal user is inconvenienced because the mobile communication terminal user needs to physically obtain a SIM card provided by a mobile communication operator in order to receive the service from the mobile communication operator. For example, when a user travels abroad, the user has to purchase a local SIM card in order to receive a local mobile communication service, which causes inconvenience to the user. A roaming service may somewhat reduce the inconvenience, but there is a problem in that the user needs to pay a high rate for the roaming service and cannot receive the service in a case in which a contract is not established between mobile communication operators.

This inconvenience may be mostly solved by remotely downloading and installing the SIM module to the UICC card. That is, the SIM module for a mobile communication service to be used may be downloaded to the UICC card at the time desired by a user. It is also possible to download and install a plurality of SIM modules to the UICC card and to selectively use only one of the SIM modules. The UICC card may be fixed or may not be fixed in a terminal. In particular, the UICC fixed in a terminal is referred to as an embedded UICC (eUICC). Typically, the eUICC is fixed to the terminal, and means a UICC card capable of remotely downloading a SIM module and selecting the SIM module. In the disclosure, the UICC card capable of remotely downloading the SIM module and selecting the SIM module will be referred to as the eUICC. That is, UICC cards that are fixed or not fixed in a terminal among the UICC cards capable of remotely downloading the SIM module and selecting the SIM module collectively referred to as the eUICC. In addition, downloaded SIM module information will be collectively referred to as an eUICC profile, or more simply, a profile.

SUMMARY

According to various embodiments, a method and an apparatus by which a terminal selects a communication service to make a communication connection in a communication system may be provided.

According to various embodiments, a method and an apparatus by which a terminal installs and manages a profile for a communication connection by downloading the profile online in a communication system may be provided.

According to various embodiments, a method and an apparatus by which a terminal can efficiently download an event in a communication system may be provided.

According to various embodiments, a method and an apparatus by which a communication operator securely notifies event download information to a terminal through a message service such as an SMS, an MMS, or an OTT in a communication system may be provided.

According to various embodiments, a method and an apparatus by which a terminal can efficiently search and detect event download information included in a message such as an SMS, an MMS, or an OTT in a communication system may be provided.

According to an embodiment, a method may include: receiving a profile related message from an operator server; identifying a second terminal and event download information based on the profile related message; and transmitting the event download information to the second terminal. The event download information may include an address and an event code of a profile server for a profile of the second terminal.

In addition, according to an embodiment, a first terminal may include: a transceiver; and a controller configured to control to receive a profile related message from an operator server, identify a second terminal and event download information based on the profile related message and transmit the event download information to the second terminal. The event download information may include an address and an event code of a profile server for a profile of the second terminal.

In addition, according to an embodiment, a method of operating an operator server may include: obtaining subscription information including a telephone number of a first terminal and identification information of a second terminal; obtaining event download information of the second terminal corresponding to the subscription information; and transmitting, based on the telephone number of the first terminal, a message including the event download information of the second terminal to the first terminal.

In addition, according to an embodiment, an operator server may include: a transceiver; and a controller configured to control to obtain subscription information including a telephone number of a first terminal and identification information of a second terminal, obtain event download information of the second terminal corresponding to the subscription information, and transmit, based on the telephone number of the first terminal, a message including the event download information of the second terminal to the first terminal.

A terminal in a wireless communication system according to various embodiments may include a transceiver and at least one processor. The at least one processor may control the transceiver so that the transceiver receives a message such as an SMS, an MMS, or an OTT including event download information from a communication operator server, searches for event download information by decrypting the received message such as the SMS, the MMS, or the OTT, transmits the event download information to another terminal if necessary, and receives an event from a profile server with reference to the event download information.

A communication operator server in a wireless communication system according to various embodiments may include a transceiver and at least one processor. The at least one processor may control the transceiver so that the transceiver receives personal information of a user including at least a telephone number of the user or identification information of the user from the user or a user agent, transmits an event generation request message to a profile server, receives an event generation result from the profile server, generates event download information with reference to the event generation request message and/or the event generation result, encrypts the event download information and an identifier of a target terminal, generates a message such as an SMS, an MMS, or an OTT including the encrypted event download information, and transmits the message such as the SMS, the MMS, or the OTT including the event download information to a terminal with reference to the personal information of the user.

A terminal in a wireless communication system according to various embodiments includes a receiver configured to receive a message such as an SMS, an MMS, or an OTT from a communication operator server, a controller configured to search for and decode the received message such as the SMS, the MMS, or the OTT to detect event download information, a transmitter configured to request an event to a profile server with reference to event download information, a receiver configured to receive the event from the profile server, and a controller configured to process the received event.

In addition, a communication operator server in a wireless communication system according to various embodiments includes a receiver configured to receive personal information of a user including at least a telephone number of the user or identification information of the user from the user or a user agent, a transmitter configured to transmit an event generation request message to a profile server, a receiver configured to receive an event generation result from the profile server, a controller configured to generate and encrypt event download information with reference to the event generation request message and/or the event generation result, a controller configured to generate a message such as an SMS, an MMS, or an OTT including the encrypted event download information, and a transmitter configured to transmit the message such as the SMS, the MMS, or the OTT including the event download information to a terminal with reference to the personal information of the user.

The technical subjects pursued in the disclosure may not be limited to the above mentioned technical subjects, and other technical subjects which are not mentioned may be clearly understood, through the following descriptions, by those skilled in the art of the disclosure.

According to various embodiments, in a communication system, a terminal can download an event from a profile server and process the event without a separate input of a user by searching for and sensing event download information from a received message such as an SMS, an MMS, or an OTT.

According to various embodiments, in a communication system, a communication operator server can notify a terminal of event download information without a user intervention by directly transmitting the event download information to the terminal via a message such as an SMS, an MMS, or an OTT.

According to various embodiments, in a communication system, a communication operator server can solve a security issue in a case in which event download information is leaked by encrypting a message such as an SMS, an MMS, or an OTT so that only a specific terminal can decrypt the message.

According to various embodiments, in a communication system, a communication operator server can add information (for example, an identifier of a terminal) of a specific terminal to a message such as an SMS, an MMS, or an OTT, to specify the terminal to use event download information among a plurality of terminals receiving the corresponding message.

According to various embodiments, in a communication system, a communication operator server can reduce the number of user mistakes that are difficult to predict and improve user's convenience by minimizing user intervention for event download information transmission.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts.

DETAILED DESCRIPTION

Figure 1:
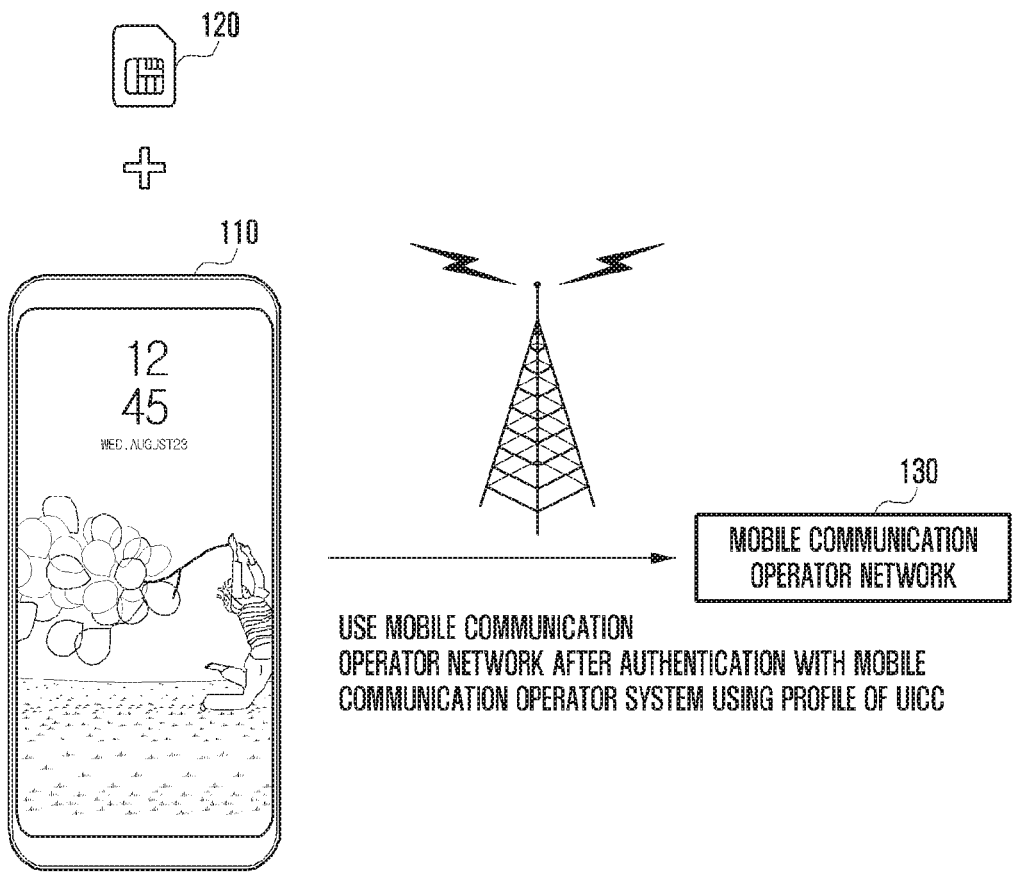
FIG. 1 illustrates a diagram of a method of connecting a terminal to a mobile communication network using a UICC on which a fixed profile is installed according to an embodiment.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present invention are described in detail with reference to the accompanying drawings.

Descriptions of functions and structures well known in the art and not directly related to the present invention may be omitted for clarity and conciseness without obscuring the subject matter of the present invention.

In the drawings, some elements are exaggerated, omitted, or only outlined in brief, and thus may be not drawn to scale. The same or similar reference symbols are used throughout the drawings to refer to the same or like parts.

The advantages and features of the present disclosure and the manner of achieving them will become apparent with reference to the embodiments described in detail below with reference to the accompanying drawings. The present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. To fully disclose the scope of the present disclosure to those skilled in the art, and the present disclosure is only defined by the scope of the claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

The specific terms used herein are provided for ease of understanding the disclosure, and such specific terms may be changed into other forms without departing from the spirit and scope of the disclosure.

First, the terms used in this specification will be defined.

A UICC in this specification is a smart card inserted into a mobile communication terminal and means a chip that stores personal information of a mobile communication subscriber, such as network access authentication information, a phone number list, and an SMS, and performs subscriber authentication and traffic security key generation when a connection is made to a mobile communication network, such as GSM, WCDMA, LTE, etc., thereby making it possible to stably use mobile communication. The UICC may be embedded with a communication application, such as a subscriber identification module (SIM), a universal SIM (USIM), an IP multimedia SIM (ISIM), etc. according to the type of a mobile communication network to which a subscriber connects, and may provide a higher level security function for loading various applications, such as an electronic wallet, ticketing, an electronic passport, etc.

In the specification, an embedded UICC (eUICC) may be a security module that is in a form of a chip embedded in a terminal, rather than a detachable security module that can be inserted into and detached from a terminal. The eUICC may download and install a profile by using an over the air (OTA) technology. The eUICC may be referred to as a UICC capable of downloading and installing a profile.

In the specification, a method of downloading and installing a profile to an eUICC by using the OTA technology may also be applied to a detachable UICC that can be inserted into and detached from a terminal. That is, embodiments of the disclosure may be applied to a UICC capable of downloading and installing a profile by using the OTA technology.

The term "UICC" in this specification may be used interchangeably with the term "SIM," and the term "eUICC" may be used interchangeably with the term "eSIM."

A profile in this specification may mean a thing in which an application, a file system, an authentication key, etc. to be stored in a UICC are packaged in a software format.

A USIM profile in this specification may have the same meaning as a profile, or may mean a thing in which information incorporated in a USIM application in a profile is packaged in a software format.

In the specification, a profile providing server includes a function of generating a profile, encrypting the generated profile, generating a profile remote management command, or encrypting the generated profile remote management command. The profile providing server may be expressed as at least one of a subscription manager data preparation (SM-DP), a subscription manager data preparation plus (SM-DP+), an off-card entity of profile domain, a profile encryption server, a profile generation server, a profile provisioner (PP), a profile provider, or a profile provisioning credentials holder (PPC holder).

In the specification, a profile management server may be expressed as at least one of a subscription manager secure routing (SM-SR), a subscription manager secure routing plus (SM-SR+), an off-card entity of eUICC profile manager, a profile management credentials holder (PMC holder), or an eUICC manager (EM).

In the specification, a combined function of the profile providing server and the profile management server may be referred to generally as the profile providing server. That is, an operation of the profile providing server as described below may also be performed by the profile management server. Likewise, it is also certain that an operation as described for the profile management server or the SM-SR may also be performed by the profile providing server. In the specification, the profile providing server or the profile management server may be expressed as a profile server. The profile server may be one of a profile providing server and a profile management server, or may be a device including both a profile providing server and a profile management server.

In the specification, an opening mediation server may be expressed as at least one of a subscription manager discovery service (SM-DS), a discovery service (DS), a root SM-DS, and an alternative SM-DS. The open mediation server may receive an event registration request (register event request, event register request) from one or more profile providing servers or open mediation servers. The one or more opening mediation servers may be used in combination, and a first opening mediation server may receive an event registration request from a second opening mediation server as well as the profile providing server. The profile server may include the opening mediation server.

In the specification, the profile providing server and the opening mediation server may be collectively referred to as a 'remote SIM provisioning (RSP) server'. The RSP server may be expressed as a subscription manager XX (SM-XX).

The term "terminal" used in this specification may be referred to as a mobile station (MS), user equipment (UE), a user terminal (UT), a wireless terminal, an access terminal (AT), a terminal, a subscriber unit, a subscriber station (SS), a wireless device, a wireless communication device, a wireless transmission/reception unit (WTRU), a moving node, a mobile, or other terms. Various embodiments of a terminal may include a cellular phone, a smart phone having a wireless communication function, a personal digital assistant (PDA) having a wireless communication function, a wireless modem, a portable computer having a wireless communication function, a photographing device, such as a digital camera, having a wireless communication function, a gaming device having a wireless communication function, a home appliance for storing and reproducing music that has a wireless communication function, an Internet home appliance capable of performing wireless Internet access and browsing, and portable units or terminals having integrated combinations of the functions thereof. Furthermore, a terminal may include, but is not limited to a machine to machine (M2M) terminal and a machine type communication (MTC) terminal/device. In the specification, the terminal may be referred to as an electronic device.

In the specification, a UICC capable of downloading and installing a profile may be embedded in the electronic device. If the UICC is not embedded in the electronic device, a UICC physically separated from the electronic device may be connected to the electronic device by being inserted into the electronic device. For example, the UICC may be in the form of a card so as to be inserted into the electronic device. The electronic device may include the terminal, and the terminal may be a terminal including the UICC capable of downloading and installing a profile. The UICC may be embedded in the terminal, and may also be inserted into the terminal so as to be connected to the terminal if the UICC is separated from the terminal. The UICC capable of downloading and installing a profile may be, for example, referred to as an eUICC.

In the specification, the terminal or the electronic device may include software or an application installed in the terminal or the electronic device to control the UICC or the eUICC. The software or application may be referred to, for example, as a local profile assistant (LPA).

In the specification, a profile delimiter may be referred to as a profile ID, an integrated circuit card ID (ICCID), a matching ID, an event identifier (event ID), an activation code, an activation code token, an ISD-P, or a factor matching a profile domain (PD). The profile ID may indicate a unique identifier of each profile. The profile delimiter may include an address of a profile providing server (SM-DP+) capable of indexing a profile.

In the specification, an eUICC identifier (eUICC ID) may be a unique identifier of the eUICC embedded in the terminal, and may be referred to as an EID. If a provisioning profile is previously included in the eUICC, the eUICC identifier (eUICC ID) may be a profile ID of the corresponding provisioning profile. If, as in an embodiment, the terminal and the eUICC chip are not separated from each other, the eUICC ID may be a terminal ID. The eUICC ID may also refer to a specific security domain of the eUICC chip.

In the specification, a profile container may be referred to as a profile domain. The profile container may be a security domain.

In the specification, an application protocol data unit (APDU) may be a message for interworking between the terminal and the eUICC. The APDU may be a message for interworking between the profile provisioner or the profile manager and the eUICC.

In the specification, profile provisioning credentials (PPC) may be a means used for mutual authentication, profile encryption, and signing between the profile providing server and the eUICC. The PPC may include at least one of a symmetric key, a rivest shamir adleman (RSA) certificate and a private key, an elliptic curved cryptography (ECC) certificate and a private key, and a root certification authority (root CA) and a certificate chain. If there are a plurality of profile providing servers, the eUICC may store or use different PPCs for the plurality of profile providing servers.

In the specification, profile management credentials (PMC) may be a means used for mutual authentication, transmission data encryption, and signing between the profile management server and the eUICC. The PMC may include at least one of a symmetric key, a RSA certificate and a private key, an ECC certificate and a private key, and a root CA and a certificate chain. If there are a plurality of profile management servers, the eUICC may store or use different PMCs for the plurality of profile management servers.

In the specification, an AID may be an application identifier. This value may be a delimiter for distinguishing between different applications in the eUICC.

In the specification, an event may be a term collectively referring management/process commands of a profile download, a remote profile management, or other profiles or an eUICC. The event may be referred to as a remote SIM provisioning operation (RSP operation) or an event record and each event may be referred to as an event identifier (event ID, eventID) corresponding to the event, a matching identifier (matching ID, matchingID), or data including an address (FQDN, ID address, or URL) of at least one of the profile providing server (SM-DP+) or the opening mediation server (SM-DS). The profile download may be interchangeably referred to as a profile installation. The event type may be used as a term indicating whether a specific event is a profile download, remote profile management (for example, deletion, activation, deactivation, replacement, update, and the like) or other profile or eUICC management/process commands. The event type may be referred to as an operation type or operationtype, an operation class or an operationclass, an event request type, an event class, an event request class, and the like.

In the specification, a profile package may be interchangeably referred to as a profile or may be used as a term indicating a data object of a specific profile or mixed with a profile, and may be referred to as a profile TLV or a profile package TLV. If the profile package is encrypted using an encryption parameter, the profile package may be referred to as a protected profile package (PPP) or a protected profile package TLV (PPP TLV). If the profile package is encrypted using an encryption parameter that can be decrypted only by a specific eUICC, the profile package may be referred to as a bound profile package (BPP) or a bundled profile package TLV (BPP TLV). The profile package TLV may be a data set (set) expressing information constituting a profile in the TLV (tag, length, value) format.

In the specification, the remote profile management (RPM) may be referred to as a profile remote management, a remote management, a remote management command, a remote command, a remote profile management package (RPM package), a profile remote management package, a remote management package, a remote management command package, and a remote command package. The RPM may be used as an application for changing a state (enabled, disabled, and deleted) of a specific profile, or changing (updating) contents of a specific profile (for example, profile nickname or profile summary information (profile metadata)). The RPM may include one or more remote management commands, the profiles subject to each remote management command may be the same or different for each remote management command.

In the specification, certificate or a digital certificate may indicate a digital certificate used for mutual authentication based on an asymmetric key including a pair of a public key (PK) and a secret key (SK). Each certificate may include one or more public keys (PK), a public key identifier (PKID) corresponding to each public key, an identifier of a certificate issuer (CI) issuing the corresponding certificate (certificate issuer ID) and a digital signature. The certificate issuer may be referred to as a certification issuer, a certificate authority (CA), or a certification authority, and the like. In the specification, the public key (PK) and the public key identifier (PKID) may be interchangeably used as the same meaning indicating a certificate including a specific public key or a corresponding public key, a part of a certificate including a part of a specific public key or a corresponding public key, a calculation result (for example, a hash value) of a specific public key or a calculation result (for example, a hash value) of a certificate including the corresponding public key, a calculation result (for example, a hash value) of a part of a specific public key or a calculation result (for example, a hash value) of a part of the certificate including the corresponding public key, or a storage space in which the pieces of data descried above are stored.

In the specification, if certificates (primary certificates) issued by one certificate issuer are used for issuing another certificate (secondary certificate), or the secondary certificates are used for issuing certificates of a tertiary certificate or higher, a correlation of the corresponding certificates may be referred to as a certificate chain or a certificate hierarchy. A CI certificate used for issuing an initial certificate may be referred to as a root of certificate, the uppermost certificate, a root CI, a root CI certificate, a root CA, a root CA certificate, and the like.

In the specification, an AKA may indicate an authentication and key agreement, and may indicate an authentication algorithm for accessing 3GPP and 3GPP2 networks.

In the specification, K is an encryption key value stored in the eUICC used in the AKA authentication algorithm.

In the specification, OPc is a parameter value that can be stored in the eUICC used in the AKA authentication algorithm.

In the specification, a NAA is a network access application program, and may be an application program such as a USIM or an ISIM for accessing a network stored in a UICC. The NAA may be a network connection module.

In the following description of the disclosure, a detailed description of known functions and configurations incorporated herein will be omitted if it may make the subject matter of the disclosure rather unclear.

FIG. 1 illustrates a diagram of a mobile communication network connection method of a terminal using a UICC on which a profile fixed to a terminal is installed according to an embodiment.

As shown in FIG. 1, the UICC 120 may be inserted into the terminal 110. For example, the UICC 120 may be a detachable type or may be embedded in the terminal 110 in advance.

A fixed profile of the UICC on which the fixed profile is installed means that 'access information' that can be connected to a specific communication operator is fixed. For example, the access information may be a K or Ki value required to authenticate a network together with an IMSI that is a subscriber delimiter and the subscriber delimiter.

The terminal 110 may perform authentication with an authentication processing system of a mobile communication operator (for example, a home location register (HLR) or AuC) using the UICC 120. For example, the authentication process may be an authentication and key agreement (AKA) process. If the terminal 110 succeeds in authentication, the terminal 110 may use a mobile communication services such as a telephone or mobile data using a mobile communication network 130 of a mobile communication system.

Figure 2:
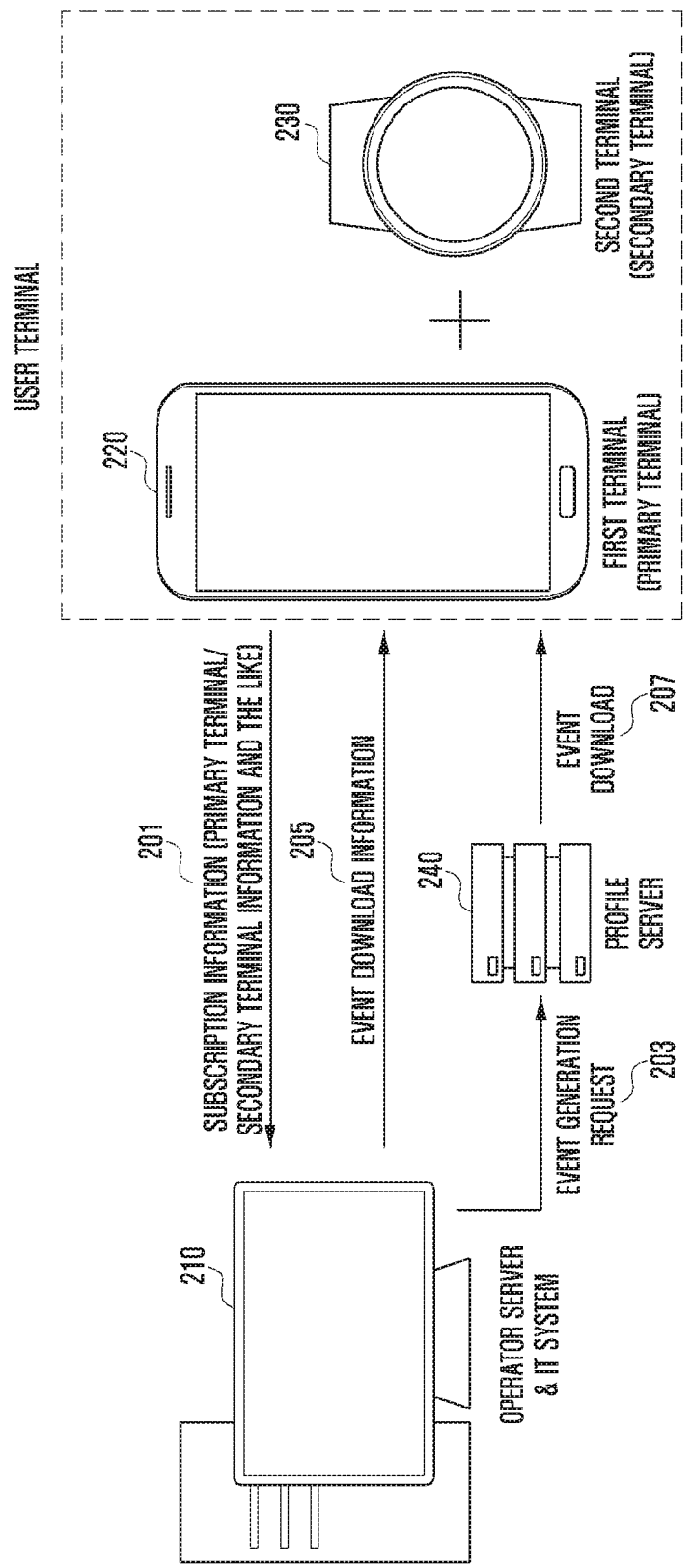
FIG. 2 illustrates a diagram of an example of a connection between a terminal, a communication operator server and a profile server, and an example of a procedure in which the terminal downloads an event from the profile server according to an embodiment.

FIG. 2 illustrates a diagram of an example of a procedure in which a terminal 220 according to an embodiment subscribes to a service of a communication operator and downloads and processes an event.

As shown in FIG. 2, the user may use a first terminal 220 and a second terminal 230. The first terminal 220 may be a terminal equipped with a SIM card or an eSIM. The first terminal 220 may be a terminal subscribed to a communication service. In the specification, the first terminal 220 may be referred to as a primary terminal, and the second terminal 230 may be referred to as an assistance terminal (secondary terminal). The second terminal 230 may be a wearable device. In order to receive the communication service of the second terminal 230 equipped with the eSIM, the user may access a point of sale (POS) of any communication operator, an IT system of a communication operator, and/or a communication operator server 210 (hereinafter collectively referred to as an "operator POS", an "operator" or an "operator server") online and/or offline. The communication service operator who intends to provide the communication service to the second terminal 230 may be the same as or different from an operator providing the communication service to the first terminal 220. FIG. 2 illustrates an example in which one second terminal 230 is connected to the first terminal 220, but it should be noted that a plurality of terminals, that is, third (not shown) to n-th terminals other than the second terminal 230 may be connected to the first terminal 220. The plurality of terminals connected to the first terminal 220 may have a unique identifier (IMEI) that can identify each terminal. In consideration of this, it goes without saying that an expression for the second terminal 230 in the drawings which will be described later as well as FIG. 2 may be expanded in consideration of the plurality of second terminals 230.

As shown in FIG. 2, in operation 201, the user may access the operator server 210 and provide subscription information necessary for providing the communication service. The subscription information may include at least one of information of the first terminal 220, information of the second terminal 230, and user personal information. The information of the first terminal 220 or the information of the second terminal 230 may include at least one of a unique identifier (IMEI) of each terminal, a model of each terminal, a SIM identifier (ICCID) and an eSIM identifier (EID) that is embedded or installed in the terminal, a SIM and eSIM model embedded or installed in each terminal, information and a telephone number of an operator providing a corresponding communication service if the first terminal 220 or the second terminal 230 has already been subscribed to an existing communication service, and an encrypt key used to encrypt an arbitrary message in a form by which the first terminal 220 and the second terminal 230 can decrypt the message. The user personal information may include at least one of a user's name, an e-mail address, service charge information, and personal identification information (ID) of an OTT service being used by the user.

In operation 203, the operator server 210 may request a profile server 240 to generate an event for the second terminal 230. At least one of the information of the first terminal 220, the information of the second terminal 230, and the user personal information which are received in operation 201 may be used for generating the event. The event may correspond to at least one of profile generation, profile installation, profile management (deletion, activation, deactivation, update, replacement, and the like). If the generation of the event is completed, the operator server 210 and the profile server 240 may share and/or store the unique identifier (a matching ID or an event ID) of the generated event. All or a part of operation 203 may be performed earlier than operation 201 described above. For example, the profile server 240 may generate the event in advance prior to an event generation request (that is, operation 203) of the operator server 210. Although FIG. 2 illustrates a case in which the profile server 240 is configured as a single server for convenience, one or more profile servers (for example, SM-DP+) may be included in the server configuration, and one or more open mediation servers (for example, SM-DS) that assist a connection generation between a specific profile server and a terminal may be included in the server configuration. It should be noted that the configurations of these various servers are briefly denoted by the profile server 240 in the following drawings.

In operation 205, the operator server 210 may transmit information for an event download to the user. For example, the operator server 210 or a push server associated with the operator server may transmit the information for the event download to the first terminal 220. The event download information may include at least one of an address of the profile server 240 of which the event is prepared in operation 203 and the unique ID (the matching ID or the event ID) of the event, or may include an indicator simply indicating that the event is ready to be generated and downloaded. The event download information may be referred to as an activation code or a command code, may be expressed as a specific text string, or may be expressed in a form in which the corresponding text string is transformed into an image such as a bar code or a QR code. The event download information may be transferred in a form of a print on a print medium such as paper or plastic, may be transferred via an electronic mail, or may be transferred in a form of data via an application installed in the electronic device and the terminal. The user may input the download event information to the first terminal 220 to second terminal 230. The event download information may be input by the user by typing the event download information expressed as the text string in the terminal, or by the terminal by performing optical character recognition of the event download information expressed in the text string. Alternatively, the event download information may be input by a method of photographing the event download information expressed as the image such as a barcode or a QR code with a terminal, a method of transmitting and receiving binary data via a network or a short distance communication, or the like may be used. If the event download information for the event download of the second terminal 230 is input to the first terminal 220, the first terminal 220 may relay the received event download information to the second terminal 230. To this end, the first terminal 220 and the second terminal 230 may be connected with each other in a wired (USB or LAN cable) manner or in a wireless (WiFi, Bluetooth or NFC) manner, and may be in mutual authentication. The first terminal 220 may be provided with an application for communicating with the second terminal 230 via the wired/ wireless connection and controlling the second terminal 230. In operation 207, the first terminal 220 and/or the second terminal 230 may download the event from the profile server 240 with reference to the event download information. All or a part of the event may be transmitted to the second terminal 230 via the first terminal 220. For example, if the second terminal 230 has limited Internet access, the first terminal 220 may perform a tethering function to provide an Internet connection to the second terminal 230. Thereafter, the second terminal 230 may process the downloaded event. For example, the second terminal 230, based on the event download information, may install a new profile or manage (activate, deactivate, delete, etc.) a previously installed profile in accordance with an event type.

Figure 3:
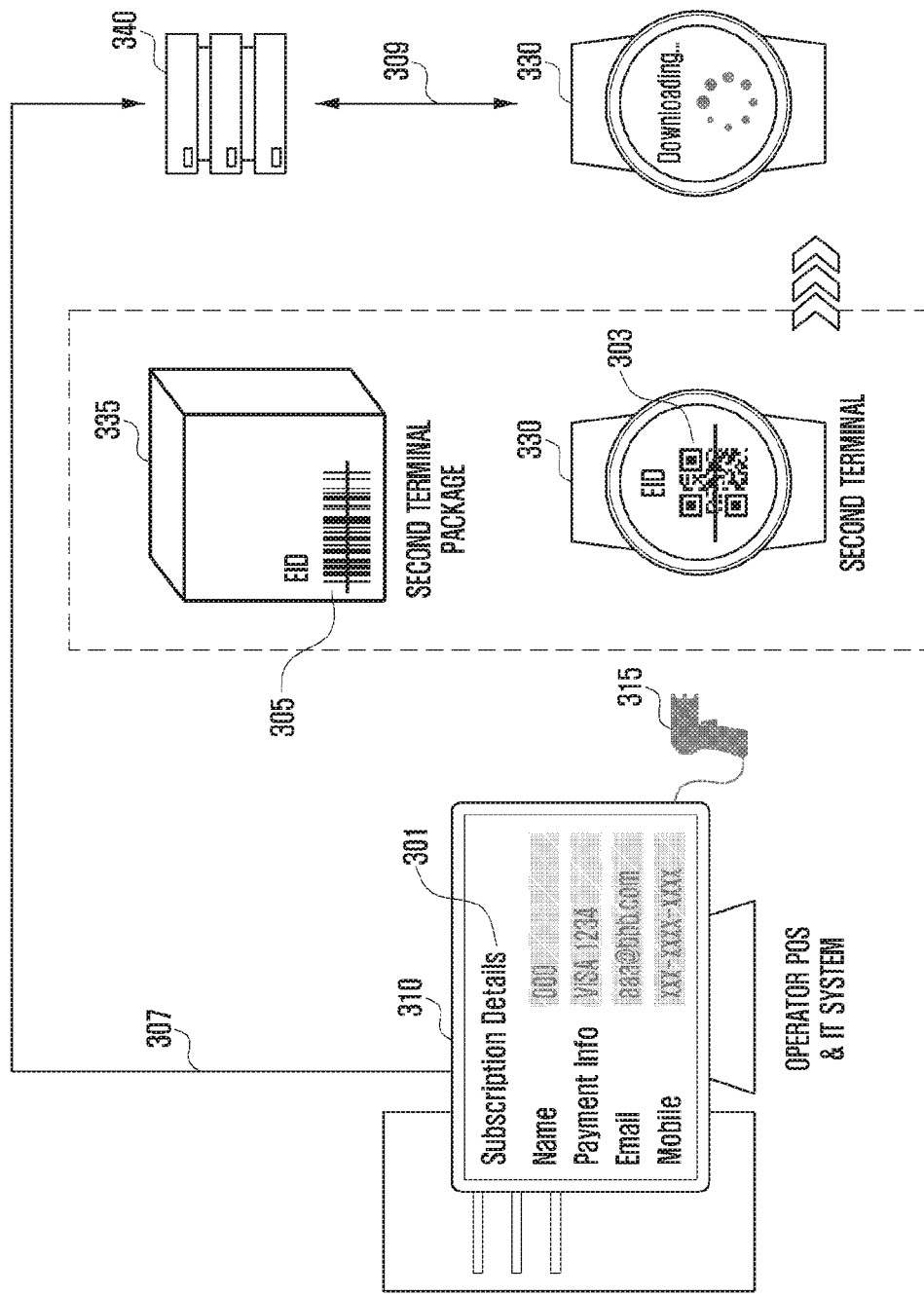
FIG. 3 illustrates a diagram of an example of a procedure in which a terminal downloads an event via a basic profile server or a basic open mediation server according to an embodiment.

FIG. 3 illustrates a diagram of a procedure for downloading and processing an event using a default profile server (default SM-DP+) or a basic open mediation server (root SM-DS) of the second terminal 330 according to an embodiment. Details of the event download information and a connection configuration between terminals refer to operation 205 of FIG. 2.

Referring to FIG. 3, at least one address of the default profile server (default SM-DP+) or the basic open mediation server (root SM-DS) may be stored in the second terminal 330. The identifier (EID) of the eUICC built in or installed in the second terminal 330 may be output on a screen of the second terminal 330, a product appearance, a product description or a product package 335. The eUICC identifier (EID) may be expressed as a text string, or may be expressed in a form in which the corresponding text string transformed into a bar code or a QR code.

Referring to FIG. 3, a scanner 315 capable of sensing and scanning a text string, a bar code, or a QR code may be connected to an operator POS 310.

In operation 301, the operator POS 310 may input the subscription information of the user. Details of the subscription information refer to operation 201 of FIG. 2.

In operation 303 or 305, the operator POS 310 may scan the identifier (EID) of the eUICC built in or installed in the second terminal 330 from the screen of the second terminal, the product appearance, the product description, or the product packaging 335. The operation may be performed by using the scanner 315 connected to the operator POS 310. Alternatively, an employee driving the operator POS 310 may manually perform input. In FIG. 3, only the eUICC identifier (EID) of the second terminal 330 is shown as being input. However, as described in operation 201 of FIG. 2, the eUICC of the first terminal 220 may be input or at least one pieces of information such as the unique identifier (IMEI) of the first terminal 220 and the second terminal 330 may be additionally input as described in operation 201 of FIG. 2 if necessary.

In operation 307, the operator POS 310 may prepare to download the event via a profile server 340. The preparation for downloading the event of operation 307 may include at least one eUICC identifier (EID) of the second terminal 330 and the event unique identifier (the matching ID or the event ID). The event download preparation of operation 307 may include one or more profile servers (for example, SM-DP+) and/or one or more open mediation servers (for example, SM-DS) as described with reference to FIG. 2. The address of the profile server 340 in operation 307 may be the address of the default profile server (default SM-DP+) or the default open mediation server (root SM-DS) already stored in the second terminal 330.

In operation 309, the second terminal 330 may request the event to the profile server 340 using the eUICC identifier (EID) and download the corresponding event from the profile server 340. For a start of operation 309, the second terminal 330 may automatically connect to the default profile server (default SM-DP+) or the basic open mediation server (root SM-DS) upon initial booting or rebooting of the second terminal 330 to confirm that the event download is prepared, or the user may instruct the second terminal 330 to access the default profile server (default SM-DP+) or the default open mediation server (root SM-DS) by operating the second terminal 330. Alternatively, an indicator indicating that the preparation for the generation and downloading of the event is completed may be pushed from the operator POS 310, the profile server 340 or a third server. The server to which the second terminal 330 initially connects in operation 309 may be the address of the default profile server (default SM-DP+) or the default open mediation server (root SM-DS) already stored in the terminal. If the basic profile server (default SM-DP+) or the basic opening mediation server (root SM-DS) re-routes or redirects the terminal to another server, the server from which the second terminal (330) actually downloads the event may be a profile server in which the operator POS 310 prepares the event in operation 307. Thereafter, the second terminal 330 may process the downloaded event. For example, the second terminal 330 may install a new profile or manage previously installed event.

Referring to FIG. 3, the operator POS 310 is required to additionally include the scanner 315 in addition to basic equipment. It may be troublesome that the operator POS 310 operates in cooperation with one or more profile servers 340 and/or the open mediation server (SM-DS) if necessary, rather than one profile server 340.

Figure 4:
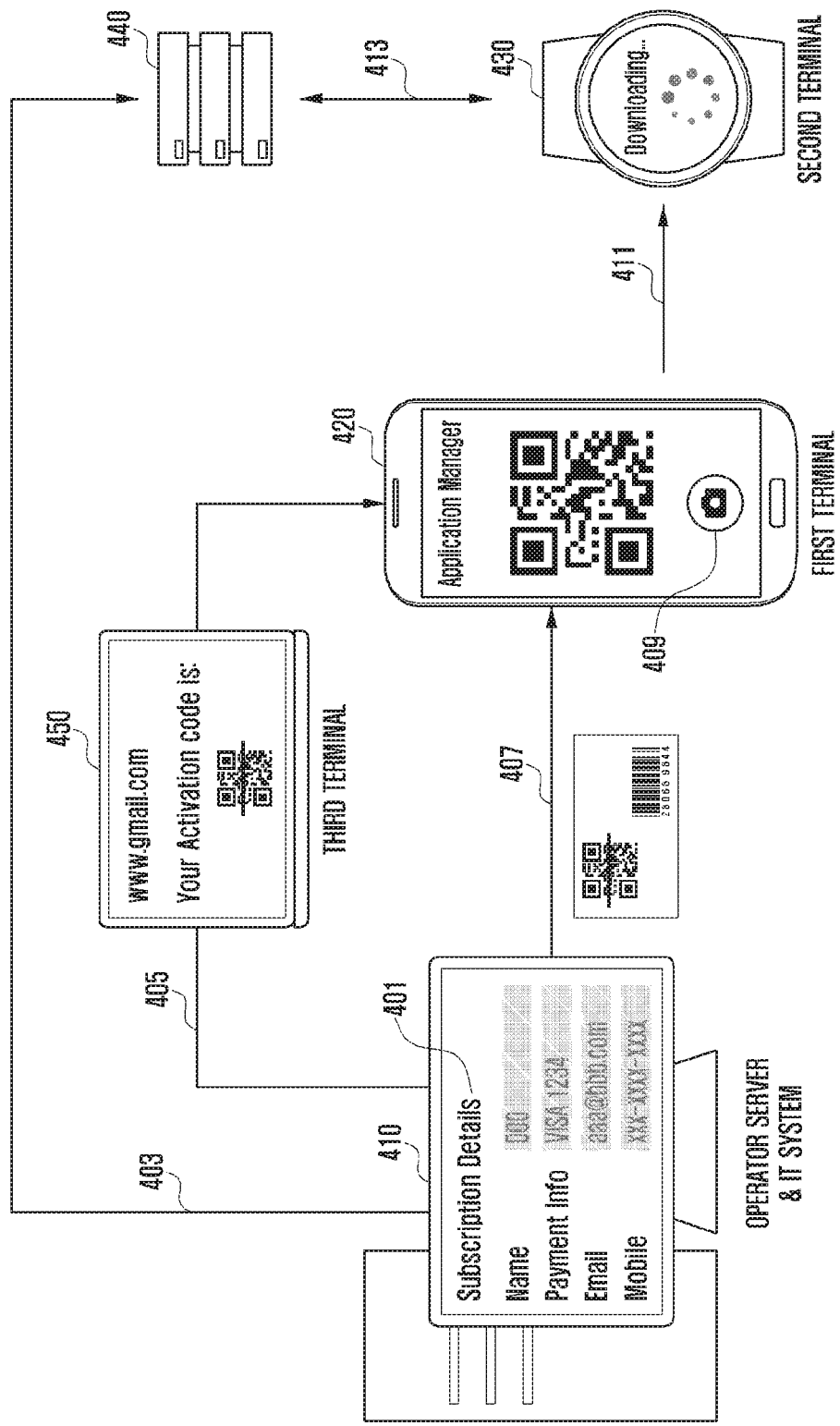
FIG. 4 illustrates a diagram of an example of a procedure in which a terminal downloads an event with reference to event download information expressed as an image according to an embodiment.

FIG. 4 illustrates a diagram of a procedure in which event download information in a form of an activation code according to an embodiment is transmitted to the second terminal 430 via the first terminal 420 and the second terminal 430 downloads and processes the event. Details of the event download information and a connection configuration between terminals refer to operation 205 of FIG. 2.

In operation 401, the operator server 410 may input the subscription information of the user. Details of the subscription information refer to operation 201 of FIG. 2.

In operation 403, an operator server 410 may prepare to download the event via a profile server 440. The event download preparation of operation 403 may include the event unique identifier (the matching ID or the event ID). The event download preparation of operation 403 may include one or more profile servers (for example, SM-DP+) and one or more open mediation servers (for example, SM-DS) as described in FIG. 2. After operation 403, the operator server 410 may generate the activation code using the address of the profile server 440 and the profile unique identifier (the matching ID or the event ID). The activation code may be expressed as a text string, or may be expressed in a form in which the corresponding text string is transformed into an image such as a bar code or a QR code.

In operation 405 or 407, the operator server 410 may transmit the generated activation code to the user. In one embodiment, in operation 405, the operator server 410 may transmit the activation code to the user's e-mail online. In another embodiment, in operation 407, the service operator server 410 may print the activation code on a print medium such as paper or plastic, and transmit the activation code to the user offline.

In operation 409, the user may input the activation code received in operations 405 to 407 to the first terminal 420 and/or the second terminal 430. If the user inputs the activation code to the first terminal 420 in operation 409, the first terminal 420 may relay the received activation code to the second terminal 430 in operation 411. The first terminal 420 may relay a part of the activation code to the second terminal 430. A method of inputting the activation code refers to operation 205 of FIG. 2. In the embodiment of FIG. 4, a case in which the activation code expressed as a QR code is photographed using a camera of the first terminal 420 and is relayed to the second terminal 430 is described. However, the input of the activation code is not limited thereto, and various methods such as operation 205 of FIG. 2 may be used. If the activation code is directly input to the second terminal 230 without going through the first terminal 220 in operation 409, operation 411 may be omitted.

In operation 413, the second terminal 430 may request the event to the profile server 440 using the activation code, and may download the corresponding event from the profile server 440. Thereafter, the second terminal 430 may process the downloaded event. For example, the second terminal may install a new profile or manage (delete, activate, deactivate, update, replace, etc.) a previously installed event.

Referring to FIG. 4, the operator server 410 has an inconvenience of generating the activation code expressed as a bar code or a QR code and transmitting the activation code to the user online or offline. The user is required to input the received activation code to the terminal. If the activation code is received online as in operation 405, it is troublesome to prepare a separate third terminal including a display to confirm the activation code. Since the corresponding activation code is not separately encrypted, a security issue that another user downloads an event may occur if the activation code is leaked.

Figure 5:
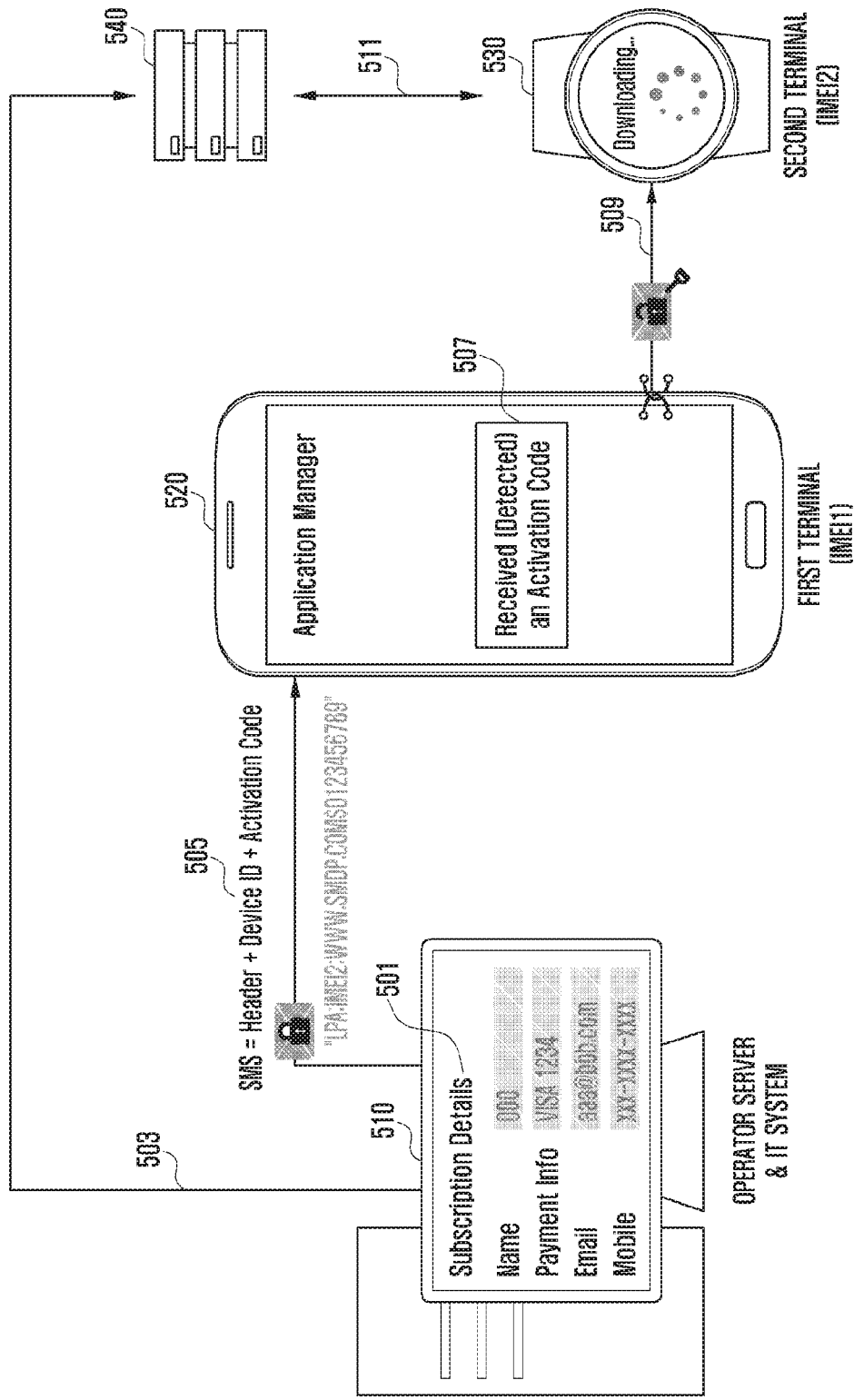
FIG. 5 illustrates a diagram of an example of a procedure in which a terminal downloads an event with reference to event download information received with a message such as an SMS, MMS, or OTT according to an embodiment.

FIG. 5 illustrates a diagram of a procedure in which if a first terminal 520 or a second terminal 530 according to the embodiment is already subscribed to the communication service, the event download information is transmitted via a message service, and the event is downloaded using the message and is processed. Details of the event download information and a connection configuration between terminals refer to operation 205 of FIG. 2.

In operation 501, an operator server 510 may input the subscription information of the user. For example, the operator server 510 may receive the subscription information of the user from the first terminal 520. Details of a method of inputting the subscription information and the subscription information refer to operation 201 of FIG. 2.

In operation 503, the operator server 510 may prepare to download the event via a profile server 540. The profile server 510 may prepare to download the event based on the input user subscription information. Details of the preparation for the event download refer to operation 205 of FIG. 2, operation 307 of FIG. 3 and operation 403 of FIG. 4.

In operation 505, the operator server 510 may transmit the event download information based on the subscription information of the user, which is input in operation 501. The operator server 510 may transmit a short messaging service (SMS) or a multimedia messaging service (MMS) to a telephone number of the communication service to which the user has already subscribed. Alternatively, the operator server 510 may transmit an over the top (OTT) message to a user identification number (ID) of an OTT service (for example, a messenger service) in use by the user. The SMS, MMS, or OTT message may include the event download information. The message including the event download information may be referred to as a profile related message.

In the embodiment, the operator server may transmit the profile related message via the SMS, MMS, or OTT message.

For example, the message such as the SMS, MMS, or OTT may include a header indicating a specific operation, at least one pieces of the information of the second terminal 230 received in operation 501 (for example, the identifier of the second terminal 230), and at least one pieces of the event download information generated in operation 503. The message such as the SMS, MMS, or OTT may include at least one of information instructing the first terminal 520 or the second terminal 530 to perform a specific operation (for example, a profile related operation) the identifier information of the second terminal 530, and the event download information for the second terminal 530. A part or all of the message such as the SMS, MMS, or OTT may be encrypted in a form that only the first terminal and/or the second terminal can decrypt the message, by using an encrypt key information among the information of the first terminal 520 and the second terminal 530, which is input in operation 501. For example, the entire header, identification information of the second terminal, event download information may be encrypted, and only some of the information may be encrypted. The header, the identification information of the second terminal, and the event download information may be encrypted with the encryption key of the first terminal 520 and some of the information may be encrypted with the encryption information of the second terminal 530. For example, at least one of the header and the identification information of the second terminal may be encrypted with the encryption information of the first terminal 520 and all or some of the remaining information may be encrypted with the encryption information of the second terminal 530. The embodiment of FIG. 5 illustrates a case in which the first terminal 520 transmits the SMS including the activation code in the form of the text string to the telephone number of the first terminal 520 by encrypting the SMS in a form that the second terminal 530 can decrypt the SMS.

Hereinafter, the type of the message will be described using an SMS as an example. However, this is for convenience of description, and the message may be applied to an MMS message or an OTT message, not an SMS message. In operation 507, the first terminal 520 may detect the SMS including the header, the information of the second terminal 530 and the event download information. The first terminal 520 may selectively notify the user that the SMS has been detected and request the user's consent or confirmation if necessary. The consent may be consent to perform the procedure for downloading or managing the profile according to the event. If the SMS is encrypted in a form that the first terminal 520 can decrypt the SMS, the first terminal 520 may decrypt the SMS.

It should be noted that an SMS detection criteria in operation 507 may be whether or not a specific header is included in the SMS and a format of the header may vary depending on an implementation of the operator server 510 and the first terminal 520. Although FIG. 5 illustrates the use of a syntax such as "LPA:" as the header, the application of the embodiment is not limited to the corresponding syntax, and the operator server 510 and the first terminal 520 may constitute the header in various combinations of all kinds of text strings and multimedia formats that can be recognized from the messages such as the SMS, MMS, or OTT. The first terminal 520 can confirm that an operation for downloading an event, downloading a profile, or the like should be triggered if predetermined information (e.g., LPA, etc.) is included in the header. If the header does not exist, the operator server 510 and the first terminal 520 may use a specific text string included in the event download information instead of the header. For example, all or a part of the address and the event identifier (the matching ID or the event ID) of the profile server (for example, SM-DP+) included in the activation code or the opening mediation server (for example, SM-DS) may replace a role of the header. For example, if the SMS message includes all or a part of the address or the event identifier of the profile server, the first terminal 520 may confirm that the operation for downloading the event, downloading the profile, or the like should be performed or triggered.

The time when the first terminal 520 performs operation 507 may vary according to the implementation of the first terminal 520. For example, the first terminal 520 may search for all the received SMS/MMS/OTT in real time. For example, a message storage unit (or a memory) storing the SMS/MMS/OTT message may be searched. Operation 507 may be performed immediately after operation 505. In another example, the first terminal 520 may perform operation 507 if a certain condition occurs. The corresponding conditions include the following examples, but are not limited to the following list.

- Case in which the first terminal 520 is first booted or rebooted
- Case in which a specific application (for example, a second terminal control application) in the first terminal 520 is driven
- Case in which the first terminal 520 is connected to the network/Internet
- Case in which an arbitrary timer configured in the first terminal 520 expires (for example, after 1 hour)
- Case in which a specific period configured in the first terminal 520 expires (for example, every month)
- Case in which a user inputs a specific operation (for example, a physical button or software button click, or a gesture such as a terminal shake) to the first terminal 520
- Case in which the first terminal 520 and the second terminal 530 are paired
- Case in which the first terminal 520 receives a search request from the second terminal 530

If the second terminal 530 is subscribed to the mobile communication service, the second terminal 530 may directly receive the SMS, MMS, or OTT message, and if the second terminal 530 satisfies a specific condition in the same manner as the condition of the first terminal 520 described above, the second terminal 530 may search for the message.

If the conditions described above occur, the first terminal 520 may search for all or a part of the SMS/MMS/OTT existing in an SMS/MMS/OTT inbox of the first terminal 520. The SMS/MMS/OTT to be searched includes the following examples, but are not limited to the following list. If the second terminal 530 directly searches for the message, the second terminal 530 may search for the message according to the following example, and is not necessarily limited to the following list.

- Full SMS/MMS/OTT list
- SMS/MMS/OTT received in a random time period before a condition occurrence (for example, last one day, and last month)
- SMS/MMS/OTT from a specific sender (for example, SMS/MMS/OTT sent from a specific operator IT system)
- SMS/MMS/OTT (for example, web outgoing SMS/MMS/OTT) with a specific means
- MMS of a specific form (for example, MMS in which an image of a specific type is included)

In operation 509, the first terminal 520 may relay the event download information included in the SMS detected in operation 507 to the second terminal 530.

Although FIG. 5 illustrates that one second terminal 530 is connected to the first terminal 520, as described in FIG. 2, if a plurality of second terminals 530 are connected to the first terminal 520, the first terminal 520 may determine the second terminal 530 to which the event download information is relayed among the plurality of second terminals 530, by using the information (for example, the identifier of the second terminal 530) of the second terminal 530 which is selectively included in the SMS detected in operation 507. FIG. 5 illustrates a case in which the identifier of the second terminal 530 in the information of the second terminal 530 is included in a text string of a form such as "IMEI2:". However, the application of the disclosure is not limited to the corresponding syntax. Other pieces of information (for example, the identifier (EID) of the eUICC included in the second terminal 530) may be included in the information of the second terminal 530 described with reference to FIG. 2. Similarly, to the description of the header, the identifier may be expressed in various combinations of all kinds of text strings and multimedia formats that can be recognized from the messages such as the SMS, MMS, or OTT.

If the SMS is encrypted in a form that the second terminal 530 can decrypt the SMS, the second terminal 530 may decrypt the SMS.

In operation 511, the second terminal 530 may request the event to the profile server 540 using the event download information, and may download the corresponding event from the profile server 540. Thereafter, the second terminal 530 may process the downloaded event. For example, processing the downloaded event may allow the second terminal 530 to install a new profile or manage (delete, activate, deactivate, update, replace, etc.) a previously installed profile. In an embodiment, the event download information may be referred to as an activation code or a command code. The event download information may include address information and event code information of the profile server. For example, in FIG. 5, WWW.SMDP.COM$0123456789 may correspond to the event download information. "WWW.SMDP.COM" in the event download information may correspond to the address of the profile server 540, and "0123456789" may correspond to the event code information. The terminal may perform an event download request (request for downloading, deleting, activating, deactivating, updating, and the like of the profile) based on the server address included in the event download information. According to the event code information, the type of the event (downloading, deleting, activating, deactivating, updating, and the like of the profile) that the terminal is required to perform may be determined. If the profile server 540 receives the request including the event code information from the first terminal 520 or the second terminal 530, the profile server 540 may perform the event corresponding to the event code. The profile server 540, the first terminal 520, and the second terminal 530 may perform operations such as downloading, deleting, activating, deactivating, updating, and the like of the profile based on the event code information.

If the second terminal 530 is subscribed to the mobile communication service, the second terminal may use the subscribed mobile communication service network and may process the downloaded event using provisioning for Wi-Fi, tethering, and profile management.

The event download information of FIG. 5 may be a command code including an address of a specific profile server (for example, SM-DP+) or an open mediation server (for example, SM-DS). It should be noted that the profile server 540 of FIG. 5 may be constituted of a plurality of servers including one or more profile servers (SM-DP+) and/or one or more open mediation servers (SM-DS) as described with reference to FIG. 2.

Although FIG. 5 illustrates an embodiment in which the first terminal 520 is already subscribed to the communication service and the second terminal 530 processes the event for convenience, it goes without saying that the same procedure can be applied even if the second terminal 530 is already subscribed to the communication service and the second terminal 530 processes the event. In this case, the first terminal 520 and operations 509 may not be needed, and it is obvious that the second terminal 530 may directly receive the event download information from the operator server 510 in the form of the message such as the SMS, MMS, or OTT via operation 505 and may detect the event download information via operation 507. Thereafter, the second terminal 530 may perform operation 511 in the same manner as described above.

Referring to FIG. 5, the operator server 510 may easily transmit the event download information to the user using a generally widely available SMS/MMS/OTT transmission function, and the user may automatically input the event download information received via the SMS/MMS/OTT to the first terminal 520 and/or the second terminal 530. Thus, as compared to the embodiment of FIG. 3, the operator server 510 need not have special scanner equipment. As compared to the embodiment of FIG. 4, the operator server 510 does not need to generate the event download information and transmit the event download information separately to the user, and the user does not need to directly input the event download information to the first terminal 520 and/or the second terminal 530. It is possible to prevent the event from being unnecessarily consumed if the corresponding SMS/MMS/OTT is transmitted to another terminal or another user for some reason, by encrypting the SMS/MMS/OTT so that only the first terminal 520 and/or the second terminal 530 can decrypt the SMS/MMS/OTT. The first terminal 520 may select an appropriate second terminal 530 if a plurality of terminals are connected to the first terminal 520, by additionally transmitting the information of the second terminal 530 to the SMS/MMS/OTT.

In the embodiment of FIG. 5, a case where the first terminal 520 downloads the event for the second terminal 530 has been described, but the embodiment is not limited thereto. The first terminal 520 may perform the operation of FIG. 5 for downloading the event for itself. In this case, the operation of the first terminal 520 for transmitting the event download information to the second terminal 530 may be omitted, and the operation of the second terminal 530 receiving the event download information may be performed in the first terminal 520. The first terminal 520 may perform an operation of downloading and managing its own profile based on the SMS/MMS/OTT message. In the embodiment of FIG. 5, the second terminal 530 inputs the subscription information to the profile server 510 via the first terminal 520 and receives the event download information via the first terminal 520. However, if the mobile communication service is provided to the second terminal 530, the second terminal 530 may perform the operation of the first terminal 510.

Figure 6:
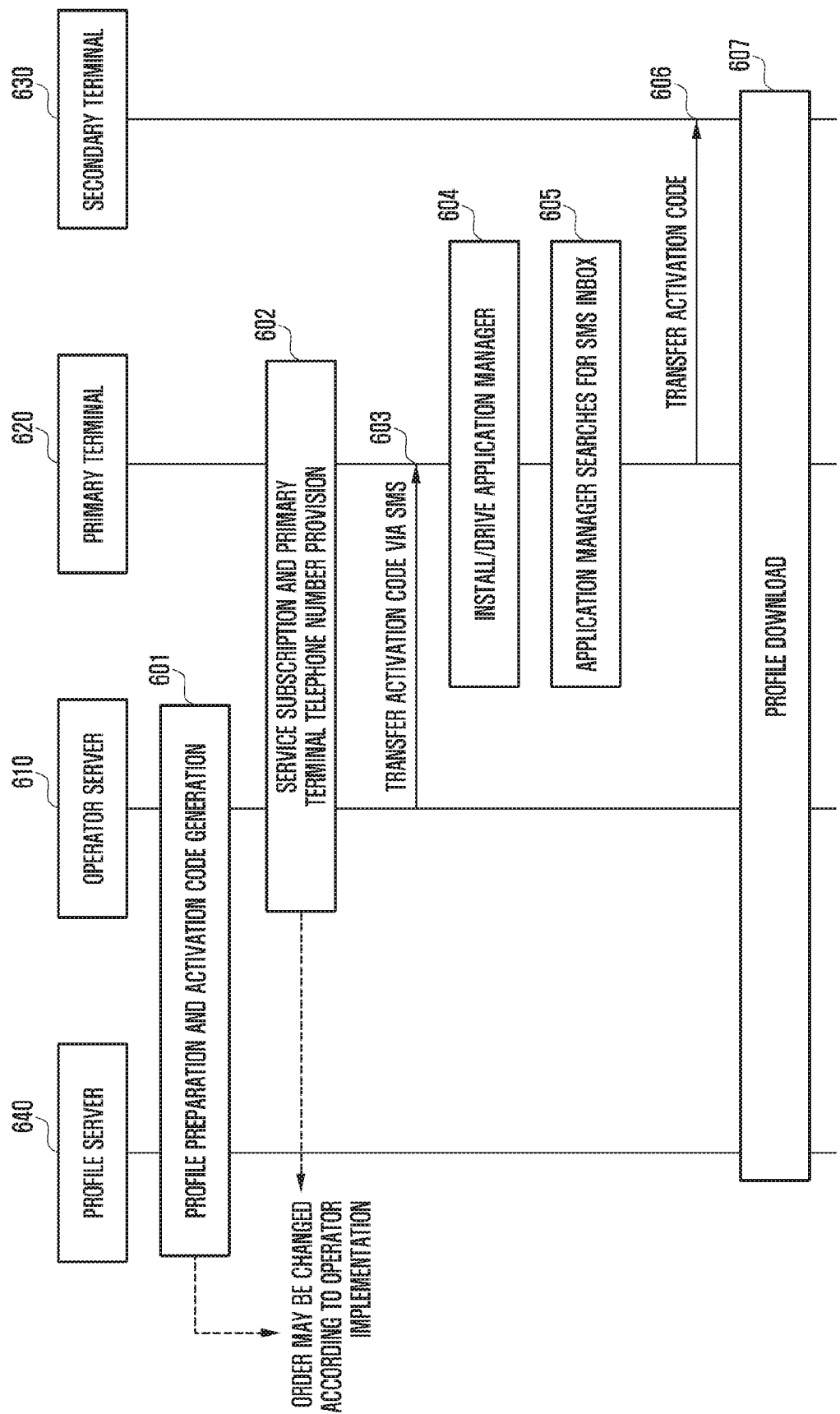
FIG. 6 illustrates a diagram of a procedure of a method of downloading an application-driving-based event according to an embodiment.

FIG. 6 illustrates a diagram of a procedure of a method of downloading an application-driving-based event according to an embodiment.

Referring to FIG. 6, a system may include an operator server 610, a primary terminal 620, a secondary terminal 630, and a profile server 640. The primary terminal 620 may be referred to as a first terminal, and the secondary terminal 630 may be referred to as a second terminal.

In operation 601, the operator server 610 and the profile server 640 may prepare a profile and generate an activation code corresponding to the profile. In operation 602, the operator server 610 may receive service subscription information including a telephone number of the primary terminal 620. The operations described in the various embodiments may be applied to a method of inputting the subscription information. If the subscription information is input, the profile prepared in operation 601 and the subscription information may be matched.

In operation 603, the operator server 610 may transmit an activation code to the primary terminal 620. The activation code may be transmitted using the SMS/MMS/OTT message and the like. The detailed operation refers to the operation of FIG. 5.

In operation 604, the primary terminal 620 may drive an application. If the application is not installed in the primary terminal 620, the application may be installed and the application may be driven. The application may be an application for managing the second terminal 630.

In operation 605, the primary terminal 620 may search for a message of the primary terminal 620 based on the driving of the application. For example, the SMS, MMS, and OTT messages and the like stored in the primary terminal 620 may be searched. For example, the SMS, MMS, and OTT messages and the like may be searched based on an operation of searching a header of a message received from the profile server 610 or identifying specific information of the activation code. The detailed operation refers to the related operation of FIG. 5.

If the message for downloading the event is confirmed, the primary terminal 620 transmits the activation code to the secondary terminal 630 in operation 606. The activation code may be encrypted using a key that the secondary terminal 630 can decrypt the activation code and may be transmitted. The detailed operation refers to the related operation of FIG. 5.

In operation 607, the secondary terminal 630 may perform the event download operation based on the activation code. For example, the secondary terminal 630 may download the profile from the profile server 640. The secondary terminal 630 may perform an operation of deleting, activating, deactivating, updating, and replacing the profile according to the type of the event. The detailed operation refers to the related operation of FIG. 5.

Figure 7:
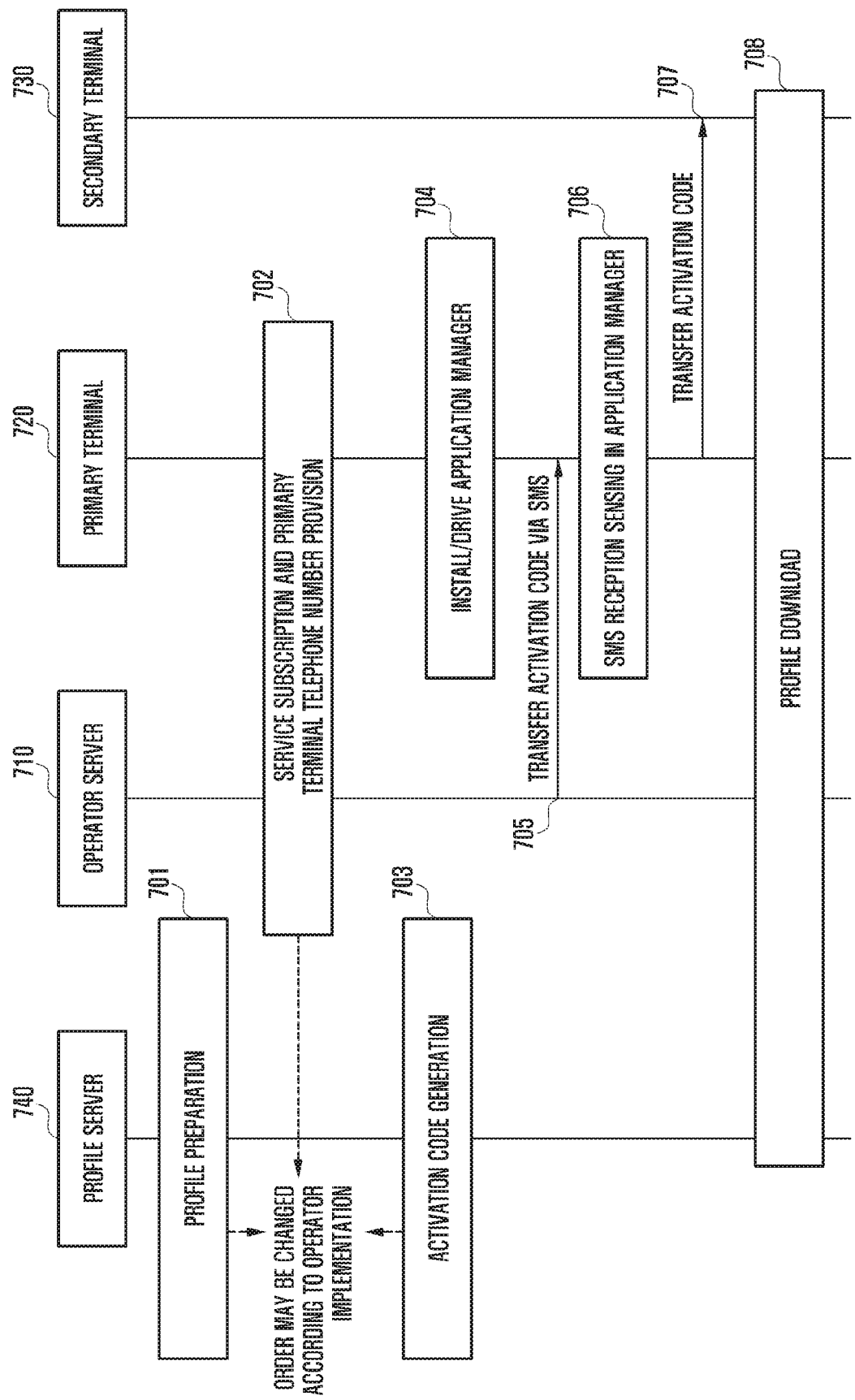
FIG. 7 illustrates a diagram of a procedure of a method of downloading an application-driving-based event according to an embodiment.

FIG. 7 illustrates a diagram of a procedure of a method of downloading an application-driving-based event according to an embodiment.

Referring to FIG. 7, a system may include an operator server 710, a primary terminal 720, a secondary terminal 730, and a profile server 740. The primary terminal 720 may be referred to as a first terminal and the secondary terminal 730 may be referred to as a second terminal.

In operation 701, the operator server 710 and the profile server 740 may prepare a profile. In operation 702, the operator server 710 may receive service subscription information including a telephone number of the primary terminal 720. The operations described in the various embodiments may be applied to a method of inputting the subscription information.

In operation 703, the profile server 740 and the operator server 710 may generate the activation code. The activation code may be generated based on the prepared profile and the subscription information. The activation code may correspond to the subscription information.

In operation 704, the primary terminal 720 may drive an application. If the application is not installed in the primary terminal 720, the application may be installed and the application may be driven. The application may be an application for managing the second terminal 730.

In operation 705, the operator server 710 may transmit the activation code to the main terminal 720. The activation code may be transmitted using the SMS/MMS/OTT message and the like. The detailed operation refers to the operation of FIG. 5.

In operation 705, the primary terminal 720 may search for a message of the primary terminal 720 based on the driving of the application. For example, the SMS, MMS, and OTT messages and the like stored in the primary terminal 720 may be searched. For example, the SMS, MMS, and OTT messages and the like may be searched based on an operation of searching a header of a message received from the profile server 710 or identifying specific information of the activation code. The detailed operation refers to the related operation of FIG. 5.

If the message for downloading the event is confirmed, the primary terminal 720 transmits the activation code to the secondary terminal 730 in operation 707. The activation code may be encrypted using a key that the secondary terminal 730 can decrypt the activation code and may be transmitted. The detailed operation refers to the related operation of FIG. 5.

In operation 708, the secondary terminal 730 may perform the event download operation based on the activation code. For example, the secondary terminal 730 may download the profile from the profile server 740. The secondary terminal 730 may perform an operation of deleting, activating, deactivating, updating, and replacing the profile according to the type of the event. The detailed operation refers to the related operation of FIG. 5.

Figure 8:
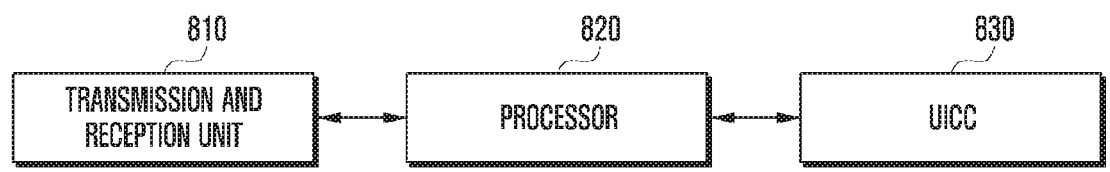
FIG. 8 illustrates a diagram of a constitution of a terminal according to an embodiment.

FIG. 8 illustrates a diagram of a configuration of a terminal according to an embodiment. In FIG. 8, a terminal may mean a first terminal (primary terminal) or a second terminal (secondary terminal). Hereinafter, the first terminal or the second terminal is referred to as a terminal.

As shown in FIG. 8, the terminal may include a transmission and reception unit (transceiver) 810 and at least one processor 820. The terminal may include a UICC 830. For example, the UICC 830 may be inserted into the terminal or may be an eUICC embedded in the terminal. The at least one processor 820 may be referred to as a control unit (or a controller).

The transmission and reception unit 810 according to various embodiments may transmit and receive signals, information, data, and the like according to various embodiments to and from the operator server or the profile server.

For example, the transmission and reception unit 810 according to various embodiments may receive the message such as the SMS, MMS, or OTT, including at least event download information (i.e., the activation code or the command code) from the operator server.

The transmission and reception unit 810 according to various embodiments may transmit the event download information included in the same message to the corresponding terminal using the terminal information included in the received message such as the SMS, MMS and OTT to the corresponding terminal.

The transmission and reception unit 810 according to various embodiments may directly receive via the message such as the SMS, MMS and OTT, or may receive the event from the profile server 840 in response to the event download information received from another terminal.

At least one processor 820 is a component for entirely controlling the terminal. The processor 820 may control the overall operation of the terminal in accordance with various embodiments as described above.

For example, at least one processor 820 according to various embodiments may decrypt the received message such as the SMS, MMS and OTT, detect the event download information and the terminal information, and determine whether to directly use the detected event download information or transfer the detected event download information to another terminal.

At least one processor 820 according to various embodiments may control the transmission and reception unit 810 to transmit the event request message including a part or all of the event download information to the profile server, receive the event from the profile server in response to the event request message, and confirm and process the received event.

The processor 820 may control to receive the profile related message from the operator server, identify the second terminal and the event download information based on the profile related message, and transmit the event download information to the second terminal. The event download information may include the address and the event code of the profile server for the profile of the second terminal. The profile related message may be at least one of a short message service (SMS) message, a multi-media message service (MMS) message or an over the top (OTT) message. The profile related message includes a header indicating a profile related operation, identification information of the second terminal and the event download information. The event download information may be used by the second terminal to transmit the event code to the profile server.

The processor 820 may control to transmit the subscriber information to the user server. The subscriber information may include a telephone number of the first terminal and the identification information of the second terminal. The subscriber information may include at least one of an encryption key of the first terminal or an encryption key of the second terminal, and all or a part of the profile related message may be encrypted with at least one of the encryption key of the first terminal or the encryption key of the second terminal. At least one of the header or the identification information of the second terminal may be encrypted with the encryption key of the first terminal, and the event download information may be encrypted with the encryption key of the second terminal.

The processor 820 may control to search for a message storage unit to identify the profile related message according to a predetermined condition. The profile related message may be identified based on a header included in the profile related message or a text string included in the event download information.

The UICC 830 according to various embodiments may download the profile and install the profile. The UICC 830 may manage the profile.

The UICC 830 may operate under control of the processor 820. Alternatively, the UICC 830 may include a processor or controller for installing the profile, or an application may be installed. A part of the application may be installed in the processor 820.

The terminal may further include a memory (not shown), and may store data such as a basic program, an application program, and configuration information for the operation of the terminal. The memory may include at least one of a flash memory type, a hard disk type, a multimedia card micro type, a card type memory (for example, an SD or XD memory, or the like), a magnetic memory, a magnetic disk, an optical disk, a random access memory (RAM), a static random access memory (SRAM), a read-only memory (ROM), a programmable read-only memory (PROM), an electrically erasable programmable read-only memory (EEPROM). The processor 820 may perform various operations using various programs, contents, data, and the like stored in the memory.

Figure 9:
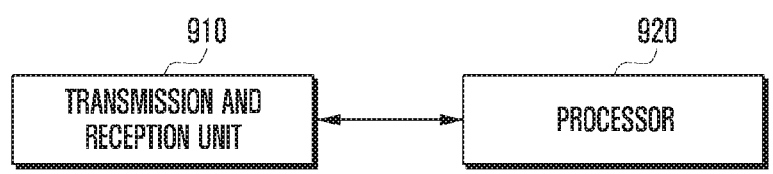
FIG. 9 illustrates a diagram of a constitution of a communication operator server according to an embodiment.

FIG. 9 illustrates a diagram of a constitution of an operator server according to an embodiment.

The operator server or the operator POS according to various embodiments may include a transmission and reception unit (transceiver) 910 and at least one processor 920.

The transmission and reception unit 910 according to various embodiments may transmit and receive signals, information, data, and the like according to various embodiments to and from the terminal or the profile server.

For example, the transmission and reception unit 910 according to various embodiments may transmit the event generation message to the profile server.

The transmission and reception unit 910 according to various embodiments may transmit the event download information (that is, the activation code or the command code) to the terminal in a form of the message such as the SMS, MMS, OTT, and the like. The event download information may include information corresponding to the event generation message transmitted to the profile server.

At least one processor 920 is a component for entirely controlling the operator server. The processor 920 may control the overall operation of the operator server in accordance with various embodiments as described above. The at least one processor 920 may be referred to as a control unit (controller).

The processor 920 may control to obtain the subscription information including a telephone number of the first terminal and the identification information of the second terminal, obtain the event download information of the second terminal corresponding to the subscription information, and transmit, based on the telephone number of the first terminal, a message including the event download information of the second terminal to the first terminal. The message may be at least one of a short message service (SMS) message, a multi-media message service (MMS) message, or an over the top (OTT) message.

For example, at least one processor 920 according to various embodiments may control the transmission and reception unit to transmit the event generation message to the profile server. The processor 920 may control the transmission and reception unit 910 to recognize the telephone number or OTT service identification information of the first terminal and/or the second terminal of the user personal information, generate the event download information including information corresponding to the event generation message, and transmit the event download information to the terminal in the form of the message such as the SMS, MMS, OTT, and the like.

The operator server may further include a memory (not shown), and may store data such as a basic program, an application program, and configuration information for the operation of the operator server. The memory may include at least one of a flash memory type, a hard disk type, a multimedia card micro type, a card type memory (for example, an SD or XD memory, or the like), a magnetic memory, a magnetic disk, an optical disk, a random access memory (RAM), a static random access memory (SRAM), a read-only memory (ROM), a programmable read-only memory (PROM), an electrically erasable programmable read-only memory (EEPROM). The processor 920 may perform various operations using various programs, contents, data, and the like stored in the memory.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. The terms "A or B", "one or more of A and/or B", "A, B, or C", or "one or more of A, B and/or C" may include all possible combinations of them. The expression "a first", "a second", "the first", or "the second" used in various embodiments of the disclosure may modify various components regardless of the order and/or the importance but does not limit the corresponding components. When an element (e.g., first element) is referred to as being "(functionally or communicatively) connected," or "directly coupled" to another element (second element), the element may be connected directly to the another element or connected to the another element through yet another element (e.g., third element).

The term "module" as used herein may include a unit consisting of hardware, software, or firmware, and may, for example, be used interchangeably with the term "logic", "logical block", "component", "circuit", or the like. The "module" may be an integrated component, or a minimum unit for performing one or more functions or a part thereof. For example, a module may be an Application-Specific Integrated Circuit (ASIC).

Various embodiments may be implemented in a machine-readable (for example, a computer-readable) storage medium (e.g., software (e.g., a program) including an command stored in an internal memory or an external memory). The machine is a device that invokes the stored command from the storage medium and is operable in accordance with the invoked command, and may include a terminal (e.g., the first terminal 220 or the second terminal 230) in accordance with various embodiments. If the command is executed by a processor (e.g., the processor 620 of FIG. 6 or the processor 720 of FIG. 7), the processor may execute a function corresponding to the command using other components directly or under the control of the processor. The commands may include code generated or executed by a compiler or an interpreter.

The machine-readable storage media may be provided in the form of non-transitory storage media. Here, the term "non-transitory" only means that the storage media is tangible without including a signal, irrespective of whether data is semi-permanently or transitorily stored in the storage media.

The method according to various embodiments disclosed in the disclosure may be provided in a computer program product. The computer program product may be traded as a product between a seller and a buyer. The computer program product may be distributed in the form of a machine-readable storage medium (e.g., compact disc read only memory (CD-ROM)), or may be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

Each of the elements (e.g., modules or programs) according to various embodiments may include a single entity or multiple entities, and in various embodiments, some sub elements among the above elements may be omitted, or other sub elements may be added. Alternatively or additionally, some elements (e.g., modules or programs) may be integrated into a single element, and the integrated element may still perform the functions performed by each of the corresponding elements in the same or similar manner as before the corresponding elements are integrated. Operations performed by a module, a programming module, or other elements according to various embodiments may be executed sequentially, in parallel, repeatedly, or in a heuristic manner. At least some operations may be executed according to another sequence, may be omitted, or may further include other operations.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of operating a first terminal, the method comprising:
receiving, from an operator server, a profile related message including a header, identification information of a second terminal, and event download information;
identifying the second terminal based on the identification information for the second terminal and the event download information based on the profile related message; and
transmitting the event download information to the second terminal,
wherein the event download information includes an event code indicating an event type of a profile and an address of a profile server,
wherein the header included in the profile related message and the identification information of the second terminal are encrypted with an encryption key of the first terminal, and
wherein the event download information is encrypted with an encryption key of the second terminal.

2. The method of claim 1, wherein the profile related message is at least one of a short message service (SMS) message, a multi-media message service (MMS) message, or an over the top (OTT) message.

3. The method of claim 1, wherein the event type corresponds to one of a download of the profile, an activation of the profile, a deactivation of the profile, a deletion of the profile, a replacement of the profile, or an update of the profile.

4. The method of claim 1, wherein the event download information is used by the second terminal to transmit the event code to the profile server.

5. The method of claim 1, further comprising transmitting subscriber information to the operator server,
wherein the subscriber information includes a telephone number of the first terminal and the identification information of the second terminal.

6. The method of claim 5, wherein the subscriber information includes at least one of the encryption key of the first terminal or the encryption key of the second terminal.

7. The method of claim 1, further comprising searching for a message storage to identify the profile related message according to a predetermined condition,
wherein the profile related message is identified based on a header included in the profile related message or a text string included in the event download information.

8. A method of operating an operator server, comprising:
obtaining subscription information including a telephone number of a first terminal and identification information of a second terminal, and further including at least one of an encryption key of the first terminal or an encryption key of the second terminal;
obtaining event download information of the second terminal corresponding to the subscription information; and
transmitting, based on the telephone number of the first terminal, a profile related message including a header, the identification information of the second terminal, and the event download information of the second terminal to the first terminal,
wherein the event download information includes an event code indicating an event type of a profile and an address of a profile server,
wherein the header included in the profile related message and the identification information of the second terminal are encrypted with an encryption key of the first terminal, and
wherein the event download information is encrypted with an encryption key of the second terminal.

9. A first terminal comprising:
a transceiver; and
a controller configured to:
receive, from an operator server, a profile related message including a header, identification information of a second terminal, and event download information,
identify the second terminal based on the identification information for the second terminal and the event download information based on the profile related message, and
transmit the event download information to the second terminal,
wherein the event download information includes an event code indicating an event type of a profile and an address of a profile server, wherein the header included in the profile related message and the identification information of the second terminal are encrypted with an encryption key of the first terminal, and wherein the event download information is encrypted with an encryption key of the second terminal.

10. The first terminal of claim 9, wherein the profile related message is at least one of a short message service (SMS) message, a multi-media message service (MMS) message, or an over the top (OTT) message.

11. The first terminal of claim 9, wherein the event type corresponds to one of a download of the profile, an activation of the profile, a deactivation of the profile, a deletion of the profile, a replacement of the profile, or an update of the profile.

12. The first terminal of claim 9, wherein the event download information is used by the second terminal to transmit the event code to the profile server.

13. The first terminal of claim 9, wherein the controller is configured to transmit subscriber information to the operator server, and wherein the subscriber information includes a telephone number of the first terminal and the identification information of the second terminal.

14. The first terminal of claim 13, wherein the subscriber information includes at least one of the encryption key of the first terminal or the encryption key of the second terminal.

15. The first terminal of claim 9, wherein the controller is configured to search for a message storage to identify the profile related message according to a predetermined condition, and wherein the profile related message is identified based on a header included in the profile related message or a text string included in the event download information.

16. An operator server comprising:
a transmission and reception unit; and
a control unit configured to:
  obtain subscription information including a telephone number of a first terminal and identification information of a second terminal, and further including at least one of an encryption key of the first terminal or an encryption key of the second terminal,
  obtain event download information of the second terminal corresponding to the subscription information, and
  transmit, based on the telephone number of the first terminal, a profile related message including a header, the identification information of the second terminal, and the event download information of the second terminal to the first terminal,
wherein the event download information includes an event code indicating an event type of a profile and an address of a profile server,
wherein the header included in the profile related message and the identification information of the second terminal are encrypted with an encryption key of the first terminal, and
wherein the event download information is encrypted with an encryption key of the second terminal.

17. The method of claim 8, wherein the event type corresponds to one of a download of the profile, an activation of the profile, a deactivation of the profile, a deletion of the profile, a replacement of the profile, or an update of the profile.

18. The operator server of claim 16, wherein the event type corresponds to one of a download of the profile, an activation of the profile, a deactivation of the profile, a deletion of the profile, a replacement of the profile, or an update of the profile.

* * * * *